US011813939B2

(12) United States Patent
Yoshida et al.

(10) Patent No.: US 11,813,939 B2
(45) Date of Patent: *Nov. 14, 2023

(54) ACCELERATOR PEDAL SYSTEM

(71) Applicant: DENSO CORPORATION, Kariya (JP)

(72) Inventors: Yuusuke Yoshida, Kariya (JP); Soichi Kinouchi, Kariya (JP); Takuto Kita, Kariya (JP); Hideyuki Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,637

(22) Filed: Aug. 23, 2022

(65) Prior Publication Data

US 2023/0066414 A1 Mar. 2, 2023

(30) Foreign Application Priority Data

Aug. 25, 2021 (JP) .................................. 2021-137325

(51) Int. Cl.
*G05G 1/30* (2008.04)
*B60K 26/02* (2006.01)
(Continued)

(52) U.S. Cl.
CPC ............... *B60K 26/02* (2013.01); *G05G 1/44* (2013.01); *G05G 5/005* (2013.01); *B60K 26/021* (2013.01);
(Continued)

(58) Field of Classification Search
CPC ............... B60K 26/02; B60K 26/021; B60K 2026/023; B60K 2026/022;
(Continued)

(56) References Cited

U.S. PATENT DOCUMENTS 7,706,953 B1 * 4/2010 Sun ..................... B60W 30/143
340/441
2013/0261889 A1 * 10/2013 Sekine ................ B60W 50/085
701/93
(Continued)

FOREIGN PATENT DOCUMENTS

DE 102010064229 A1 * 6/2012 ........... B60K 26/021
EP 2196348 A1 * 6/2010 ........... B60K 26/021
(Continued)

OTHER PUBLICATIONS

Machine Translation of DE-102010064229-A1.*
(Continued)

*Primary Examiner* — Richard W Ridley
*Assistant Examiner* — Brian J McGovern
(74) *Attorney, Agent, or Firm* — Nixon & Vanderhye P.C.

(57) ABSTRACT

An accelerator pedal system includes a pedal lever that performs an operation in accordance with a step-on operation, a lock mechanism configured to restrict the operation of the pedal lever, and an actuator configured to switch between a locked state in which the operation of the pedal lever is restricted by the lock mechanism and an unlocked state in which the operation of the pedal lever is not restricted by the lock mechanism. A controller includes a locking operation determination unit that determines switching of a locking operation by the lock mechanism, an actuator control unit that controls a driving operation of the actuator, and an information acquisition unit that acquires vehicle speed information. The locking operation determination unit locks the pedal lever when a vehicle is traveling in an automatic driving mode and when a vehicle speed is equal to or more than an activation-determination lower limit value.

11 Claims, 10 Drawing Sheets

(51) Int. Cl.
    *G05G 5/00*     (2006.01)
    *G05G 1/44*     (2008.04)
    *B60Q 9/00*     (2006.01)
    *G05G 1/38*     (2008.04)
    *G05G 5/03*     (2008.04)

(52) U.S. Cl.
    CPC .............. *B60Q 9/00* (2013.01); *G05G 1/30* (2013.01); *G05G 1/38* (2013.01); *G05G 5/03* (2013.01); *G05G 2505/00* (2013.01)

(58) Field of Classification Search
    CPC ...... B60K 2026/026; G05G 1/30; G05G 1/40; G05G 1/405; G05G 1/38; G05G 1/44; G05G 5/005; G05G 5/03; G05G 5/05; G05G 5/28; B60W 30/143; B60W 2540/10
    See application file for complete search history.

(56) References Cited

U.S. PATENT DOCUMENTS

2017/0217312 A1* 8/2017 Schweinfurth .......... F02D 11/02
2019/0322172 A1* 10/2019 O Meachair ........ B60W 30/143

FOREIGN PATENT DOCUMENTS

EP     2384921     11/2011
GB     2540464 A * 1/2017 ........... B60K 26/021

OTHER PUBLICATIONS

Machine Translation of EP-2196348-A1.*
U.S. Appl. No. 17/893,618 to Yuusuke Yoshida, filed Aug. 23, 2022 (25 pages).
U.S. Appl. No. 17/893,668 to Yuusuke Yoshida, filed Aug. 23, 2022 (22 pages).
U.S. Appl. No. 17/893,700 to Soichi Kinouchi, filed Aug. 23, 2022 (24 pages).
U.S. Appl. No. 17/893,752 to Soichi Kinouchi, filed Aug. 23, 2022 (22 pages).
U.S. Appl. No. 17/893,801 to Soichi Kinouchi, filed Aug. 23, 2022 (25 pages).
U.S. Appl. No. 17/893,842 to Soichi Kinouchi, filed Aug. 23, 2022 (33 pages).
U.S. Appl. No. 17/893,883 to Soichi Kinouchi, filed Aug. 23, 2022 (28 pages).

* cited by examiner

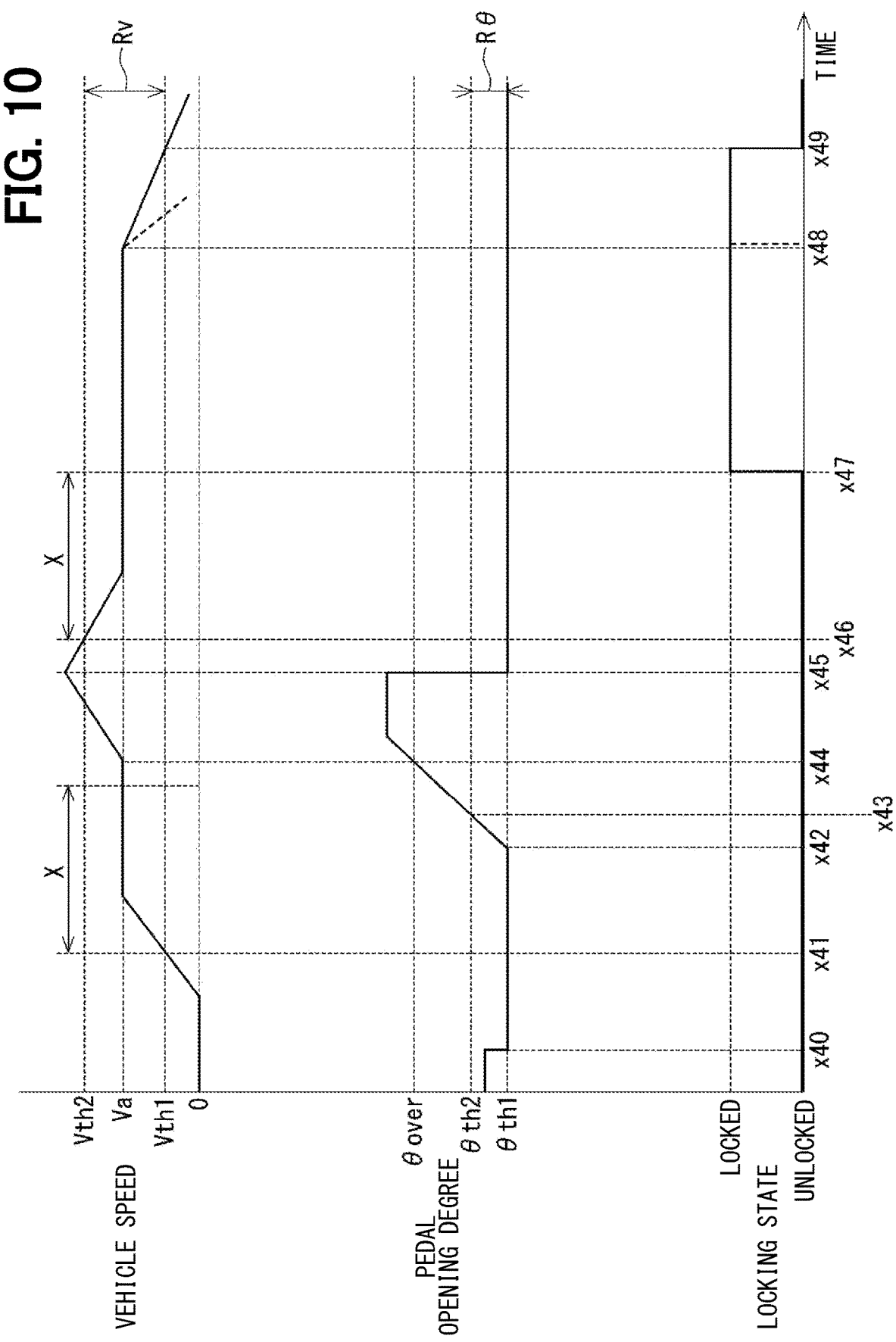

ACCELERATOR PEDAL SYSTEM

CROSS REFERENCE TO RELATED APPLICATION

The application is based on a Japanese Patent Application No. 2021-137325 filed on Aug. 25, 2021, the contents of which are incorporated herein by reference in its entirety.

TECHNICAL FIELD

The present disclosure relates to an accelerator pedal system.

BACKGROUND

Conventionally, there is a known system that has a cruise control function for maintaining a constant traveling speed of a vehicle. For example, when a vehicle is in a cruise control mode, a pedal device generates a force necessary to hold a pedal, so that the pedal functions as a footrest.

SUMMARY

An accelerator pedal system according to an exemplar of the present disclosure may include a pedal lever configured to perform an operation in accordance with a step-on operation, a lock mechanism configured to restrict the operation of the pedal lever, an actuator configured to switch between a locked state in which the operation of the pedal lever is restricted by the lock mechanism and an unlocked state in which the operation of the pedal lever is free from restriction by the lock mechanism, and a controller. The controller may include a locking operation determination unit configured to determine switching of a locking operation by the lock mechanism, an actuator control unit configured to control a driving operation of the actuator, and an information acquisition unit configured to acquire vehicle speed information. The locking operation determination unit may be configured to lock the pedal lever (i) when a vehicle is traveling in an automatic driving mode and (ii) when a vehicle speed is equal to or more than an activation-determination lower limit value. Thus, it is possible to appropriately control a locking state of the pedal lever.

BRIEF DESCRIPTION OF THE DRAWINGS

The above and other objects, features and advantages of the present disclosure will become more apparent from the following detailed description made with reference to the accompanying drawings. In the drawings:

FIG. 10 is a time chart showing the locking operation control process according to the third embodiment.

DESCRIPTION OF EMBODIMENTS

For example, when a vehicle is in a cruise control mode, a pedal device generates a force necessary to hold a pedal, so that the pedal functions as a footrest.

In a case where the cruise control mode is used at the time of low speed traveling in an urban area or the like, there are many chances that a pedal needs to be operated depending on a surrounding traffic situation as compared with a case where high speed traveling is performed on a limited highway. Therefore, when the pedal is made to serve as a footrest in the cruise control mode in a situation where there are many chances of operating the pedal, for example, in an urban area, the number of times of releasing the footrest state increases, and an increasing burden of operation can be placed on the driver.

The present disclosure has been made in view of the above issues, and an object of the present disclosure is to provide an accelerator pedal system capable of appropriately controlling a state of locking of an accelerator pedal lever.

Hereinafter, an accelerator pedal system according to the present disclosure will be described with reference to the drawings. In a plurality of embodiments, substantially the same components are denoted by the same reference signs, and the description thereof is omitted.

First Embodiment

Figure 1:
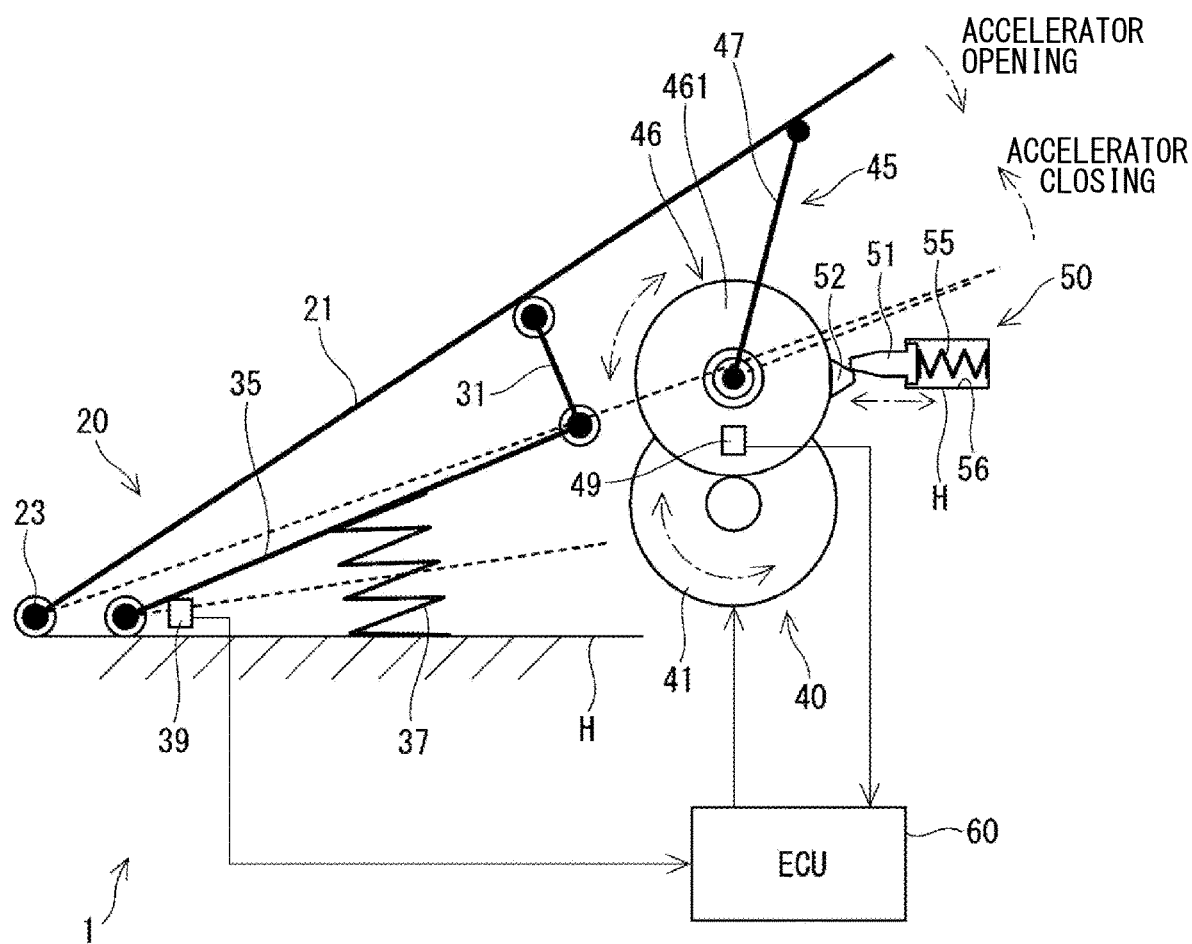
FIG. 1 is a schematic diagram illustrating an accelerator pedal system according to a first embodiment.

A first embodiment is illustrated in FIGS. 1 to 5. As illustrated in FIG. 1, an accelerator pedal system 1 includes a pedal lever 20, an actuator 40, a power transmission mechanism 45, a lock mechanism 50, an electronic control unit (ECU) 60 serving as a controller, and the like.

The pedal lever 20 includes a pad 21, an arm 31, and a pedal 35, and is integrally driven by a driver's step-on operation or the like. The pad 21 is provided operable by a driver's step-on operation. The pad 21 is rotatably supported by a fulcrum member 23 provided on a housing H. FIG. 1 illustrates a so-called floor type (organ type) pedal in which the pad 21 is provided to extend in a direction along one surface of the housing H. However, a suspension type (pendant type) pedal may be used. In the present embodiment, the housing portions such as a pedal housing and a motor housing that are not driven by driving of a motor 41 or a step-on operation of the pedal lever 20 are collectively referred to as a "housing H".

The arm 31 couples between the pad 21 and the pedal 35. One end of the pedal 35 is rotatably supported by the housing H, and the other end is connected to the arm 31. With this arrangement, the pad 21, the arm 31, and the pedal 35 are integrally driven by an operation of the pad 21 by the driver. A pedal opening degree sensor 39 that detects a pedal opening degree θ is provided on one end side of the pedal 35.

Figure 2:
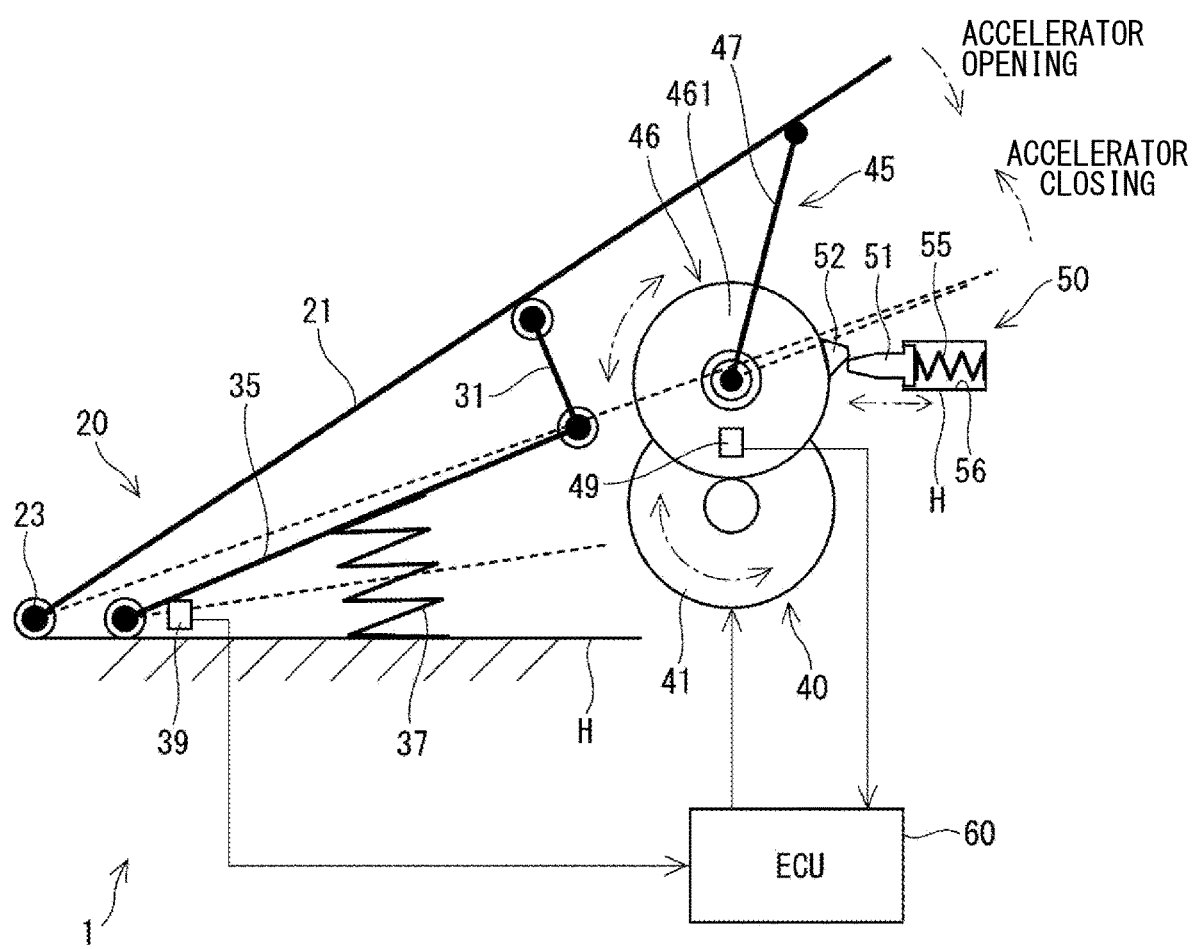
FIG. 2 is a schematic diagram illustrating a state where a pedal lever is locked in the accelerator pedal system according to the first embodiment.

A pedal biasing member 37 is a compression coil spring and biases the pedal 35 in an accelerator closing direction, with one end fixed to the pedal 35 and the other end fixed to the housing H. In FIGS. 1 and 2, the solid lines depict a state of fully closed acceleration, and the broken lines depict a state of fully opened acceleration.

The actuator 40 includes the motor 41 and a power transmission mechanism 45. The motor 41 is, for example, a DC motor, and driving of the motor 41 is controlled by the ECU 60. The driving force of the motor 41 is transmitted to the pedal lever 20 via the power transmission mechanism 45. It can be said that the actuator 40 is a series of components that transmits power from the motor 41 as a drive source to the pedal lever 20 via the power transmission mechanism 45.

The power transmission mechanism 45 includes a gear set 46, a power transmission member 47, and the like. The gear set 46 is configured with: a motor gear that rotates integrally with a motor shaft; and a plurality of gears that mesh with the motor gear, and the gear set 46 transmits the driving force of the motor 41 to the power transmission member 47. The gear set 46 includes a gear 461 that is provided with a locked portion 52 to be locked as described later. The gear 461 is provided with a position sensor 49 that detects a rotational position. Hereinafter, the rotational directions of the motor 41, the gear 461, and the like when the gear 461 is rotated counterclockwise on the paper surface are defined as positive, and the rotational directions of the motor 41, the gear 461, and the like when the gear 461 is rotated clockwise on the paper surface are defined as negative.

The power transmission member 47 is, for example, a cam, and one end side of the power transmission member 47 meshes with the gear set 46, so that the power transmission member 47 is rotationally driven by driving of the motor 41. The other end side of the power transmission member 47 is in contact with the pedal lever 20. With this arrangement, the driving force of the motor 41 is transmitted to the pedal lever 20. In FIG. 1, the other end of the power transmission member 47 is in contact with the pad 21, but may be in contact with the arm 31 or the pedal 35.

By rotating the motor 41 in the positive direction in a state where the power transmission member 47 and the pedal lever 20 are in contact with each other, it is possible to apply a reaction force in a push-back direction to the pedal lever 20. In addition, when no reaction force is applied to the pedal lever 20, it is desirable to rotate the motor 41 in the negative direction and thereby to retract the power transmission member 47 so that the pedal lever 20 and the power transmission member 47 will not be in contact with each other in the entire range from the fully closed state to the fully opened state of the pedal lever 20. Therefore, when no reaction force is applied, it is possible to prevent a cogging torque or the like from the power transmission mechanism 45 side from affecting a pedal force.

By applying a reaction force in the push-back direction to the pedal lever 20 by the motor 41, for example, by applying a reaction force to provide a sense of wall when a fuel consumption is determined, on the basis of the driving situation, to be deteriorated if the pad 21 is stepped on, the stepping on of the pad 21 by the driver is prevented or reduced. Accordingly, a fuel efficiency can be improved. Further, for example, by pulse-driving the pedal lever 20 in the push-back direction, the pulse-driving can be used to transmit information such as notification of switching from automatic driving to manual driving.

The lock mechanism 50 includes a locking member 51, a locked portion 52 to be locked, a resilient member 55, and the like. The locking member 51 has a tapered surface formed on one end side of the locking member 51 and is disposed such that the tapered surface is in contact with the locked portion 52. The other end side of the locking member 51 is accommodated in an accommodation chamber 56 formed on the housing H and is provided to be reciprocally movable in the axial direction. The locked portion 52 is provided to protrude from the gear 461 constituting the gear set 46, and rotates integrally with the gear 461. The locked portion 52 comes into contact with the locking member 51 on the tapered surface.

The resilient member 55 is accommodated in the accommodation chamber 56 provided on the housing H. One end of the resilient member 55 is in contact with the locking member 51, and the other end is engaged with the housing H, whereby the resilient member 55 biases the locking member 51 toward the locked portion 52.

FIG. 1 illustrates a state when locking is just started. When the gear 461 is rotated counterclockwise on the paper surface by the driving force of the motor 41 in a state where the locked portion 52 and the locking member 51 are in contact with each other, the locked portion 52 pushes the locking member 51 and thereby compresses the resilient member 55. When the gear 461 is further rotated counterclockwise and the locked portion 52 goes over and gets around the locking member 51 to the upper side on the paper surface, the locking member 51 returns to an initial position by the biasing force of the resilient member 55.

As illustrated in FIG. 2, in a locked state, since the locking member 51 latches the locked portion 52 by the biasing force of the resilient member 55, the rotation of the gear 461 is restricted. In addition, the power transmission member 47 functions as a locking force transmission member, so that the operation of the pedal lever 20 is restricted. As a result, the operation of the pedal lever 20 can be restricted in a non-energized state in which the energization of the motor 41 is turned off.

Hereinafter, to restrict the operation of the pedal lever 20 is simply referred to as "to lock". For example, during automatic driving or the like, it is possible to secure comfort by locking the pedal lever 20 and by thus making the pad 21 function as a footrest. In the present embodiment, the description is given, assuming that the pedal lever 20 is locked at a fully closed position.

When the gear 461 is rotated clockwise on the paper surface from the locked state illustrated in FIG. 2 by the driving force of the motor 41, the locked portion 52 pushes the locking member 51, so that the resilient member 55 is compressed. When the locked portion 52 goes over and gets around the locking member 51 to the lower side on the paper surface, the locked state is released, so that the locking member 51 returns to the initial position by the biasing force of the resilient member 55. Also, when a predetermined pedal force or more pedal force is applied to the pedal lever 20, the locked state can be similarly released.

When the pedal lever 20 is kept unlocked, it is desirable to further rotate the gear 461 clockwise from the state illustrated in FIG. 1 to retract the locked portion 52 so that the locking member 51 and the locked portion 52 will not come into contact with each other.

Figure 3:
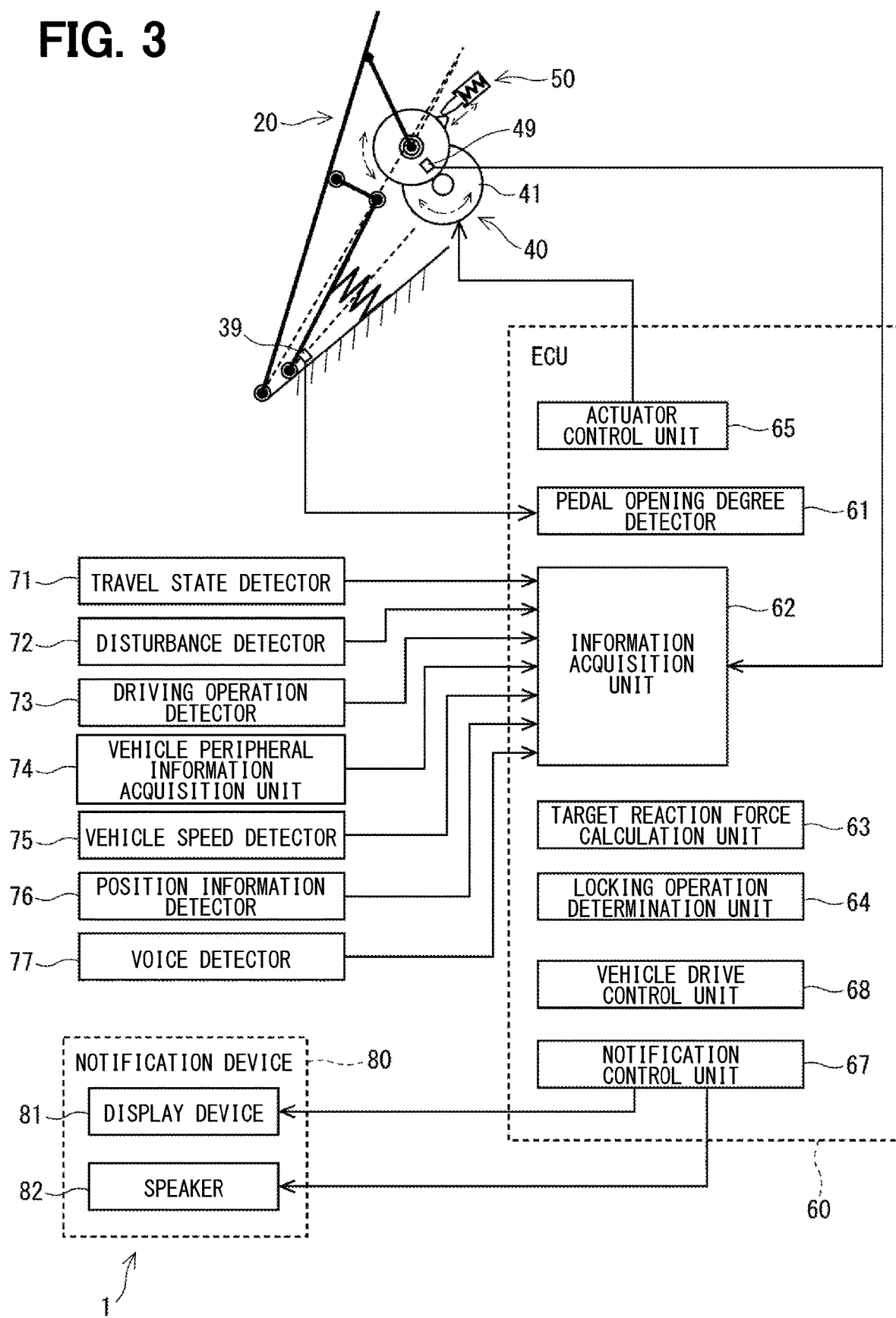
FIG. 3 is a block diagram illustrating a control configuration of the accelerator pedal system according to the first embodiment.

As illustrated in FIG. 3, the ECU 60 is mainly configured with a microcomputer or the like, and includes therein: a central processing unit (CPU), a read-only memory (ROM), a random-access memory (RAM), an input/output interface (I/O), which are all not illustrated; a bus line that connects these components; and other components. Processes in the ECU 60 may be realized by software processing that is performed by the CPU executing a program previously stored in a physical memory device such as a ROM or the like (that is, a readable non-transitory tangible recording medium), and the processes may be realized by hardware processing performed by a dedicated electronic circuit.

The ECU 60 includes, as functional blocks: a pedal opening degree detector 61; an information acquisition unit 62; a target reaction force calculation unit 63; a locking operation determination unit 64; an actuator control unit 65; a notification control unit 67; a vehicle drive control unit 68; and the like. Although the ECU 60 is depicted as a single ECU 60 in FIG. 3, some of the functions may be configured with a separate ECU or the like.

The pedal opening degree detector 61 detects the pedal opening degree θ on the basis of a detection value of the pedal opening degree sensor 39. The information acquisition unit 62 acquires various types of information from the following components: the position sensor 49, a travel state detector 71, a disturbance detector 72, a driving operation detector 73, a vehicle peripheral information acquisition unit 74, a vehicle speed detector 75, a position information detector 76, a voice detector 77, and the like.

The target reaction force calculation unit 63 calculates a target reaction force to be applied to the pedal lever 20. On the basis of various types of information acquired by the information acquisition unit 62, the locking operation determination unit 64 makes a determination related to switching between a locked state in which the pedal lever 20 is locked and an unlocked state in which the pedal lever 20 is not locked. Hereinafter, as appropriate, switching from the unlocked state to the locked state is referred to as "lock activation", and switching from the locked state to the unlocked state is referred to as "lock releasing". The actuator control unit 65 controls driving of the motor 41 on the basis of the target reaction force, a determination result of the locking operation determination unit 64, and the like.

The notification control unit 67 notifies the notification device 80 of information that the driver is to be notified of. In the present embodiment, information related to lock activation and lock releasing of the pedal lever 20 is notified of. The vehicle drive control unit 68 controls driving of the vehicle.

The travel state detector 71 detects a driving mode as a traveling state. The driving mode includes an override mode in addition to an automatic driving mode and a manual driving mode. The control in the automatic driving mode is a cruise control such as an adaptive cruise control (ACC), but details of the control does not matter. In the override mode, both an input from the control by the automatic driving and a step-on input from the driver are input, and the input by the step-on operation of the driver is always prioritized in the override mode.

The disturbance detector 72 detects a disturbance on the basis of information of a G sensor that detects acceleration, a suspension behavior detection device, an indoor camera, and the like. The disturbance includes, for example, a vehicle deceleration G caused by a relatively rapid deceleration, a vehicle vibration caused by a stepped road surface and the like. Further, the disturbance may include non-driving-operation motions that are motions other than normal driving motions, for example, reseating of the driver, wearing and removing the seat belt, picking up a fallen object, stretching, and a driver's state of consciousness.

The driving operation detector 73 detects a turn signal operation and a steering wheel manipulation by the driver. The vehicle peripheral information acquisition unit 74 detects oncoming other vehicles, obstacles, and the like by road-to-vehicle communication, vehicle-to-vehicle communication, an onboard camera, radar, and the like.

The vehicle speed detector 75 detects a vehicle speed, which is a traveling speed of the vehicle. The vehicle speed detector 75 does not have to use a vehicle speed sensor, and may be configured to detect the vehicle speed by performing calculation using positional data of the global positioning system (GPS). The position information detector 76 detects the current position of the vehicle on the basis of information from map information, the GPS, road-to-vehicle communication, an onboard camera, and the like. The position information detector 76 may use the above-described types of information alone or in combination. In addition, information other than the above-described information may be used.

The voice detector 77 detects a voice emitted by an occupant. The notification device 80 includes: a display device 81, which is a display or the like; and a speaker 82, and notifies the driver of various types of information.

In the present embodiment, since the pedal lever 20 can be locked by the lock mechanism 50, it is possible to make the pedal lever 20 function as a footrest by locking the pedal 20 in the cruise control for keeping the drive speed constant. In a case where the cruise control mode is used in an urban area, there are many cases where a pedal operation is required according to a surrounding traffic situation such an acceleration operation from deceleration as compared with the case of traveling on a limited highway. Therefore, when the pedal lever 20 is made to function as a footrest in the cruise control mode in a situation, for example, in an urban area, where the pedal often needs to be operated, the number of releasing operations of the footrest state increases, and an increasing burden of operation can be placed on the driver.

To address this issue, in the present embodiment, the pedal is allowed to be locked and function as a footrest on the basis of vehicle speed information when the automatic driving is performed during a high-speed traveling in which there are not many chances to stop the pedal lever 20 from functioning as a footrest.

A locking operation control process of the present embodiment will be described with reference to the flowchart of FIG. 4. This process is performed by the ECU 60 at a predetermined cycle. Hereinafter, the term "step" such as step S101 is omitted, and is simply written as the symbol "S".

In S101, the ECU 60 determines whether the current travel mode is the automatic driving mode. In this step, it is considered that the override mode is not the automatic driving mode. In the override mode, the automatic driving is temporarily canceled by, for example, an operation of the pedal lever 20 or the brake pedal, and an operation by the driver is reflected to the driving. If the driving mode is determined not to be the automatic driving mode (S101: NO), the process proceeds to S109. If the driving mode is determined to be the automatic driving mode (S101: YES), the process proceeds to S102.

In S102, the information acquisition unit 62 acquires vehicle speed information from the vehicle speed detector 75. In S103, it is determined whether a vehicle speed V is equal to or more than an activation-determination lower limit value Vth. The activation-determination lower limit value Vth is set to a value with which it can be determined that the vehicle is traveling on a limited highway such as an expressway, where a pedal operation is not required frequently. If the vehicle speed V is determined to be smaller than the activation-determination lower limit value Vth (S103: NO), the process proceeds to S109. If the vehicle speed V is determined to be equal to or more than the activation-determination lower limit value Vth (S103: YES), the process proceeds to S104.

In S104, the locking operation determination unit 64 determines whether the pedal lever 20 is in a locked state. If the pedal lever 20 is determined to be in a locked state (S104: YES), the processes of S105 and the following steps are skipped, and the locked state is maintained. If the pedal lever 20 is determined not to be in the locked state (S104: NO), the process proceeds to S105.

In step S105, the notification control unit 67 issues, via the notification device 80, a notification for prompting a determination whether to lock the pedal lever 20 or not. In S106, the locking operation determination unit 64 determines whether the driver has selected lock activation. If lock activation is not selected (S106: NO), the processes of S107 and the following steps are skipped. If lock activation is selected (S106: YES), the process proceeds to S107.

In S107, the actuator control unit 65 drives the motor 41 to lock the pedal lever 20. In S108, the notification control unit 67 notifies the driver of the information indicating that the pedal lever 20 has got locked, via the notification device 80.

When a negative determination is made in S101 or S103, the process proceeds to S109. In S109, the locking operation determination unit 64 determines whether the pedal lever 20 is in a locked state. If the pedal lever 20 is determined not to be in a locked state (S109: NO), the processes of S110 and the following steps are skipped, and the unlocked state is maintained. If the pedal lever 20 is determined to be in a locked state (S109: YES), the process proceeds to S110.

In S110, the actuator control unit 65 drives the motor 41 to unlock the pedal lever 20. In S111, the notification control unit 67 notifies the driver of the information indicating that the pedal lever 20 has got unlocked, via the notification device 80.

Figure 5:
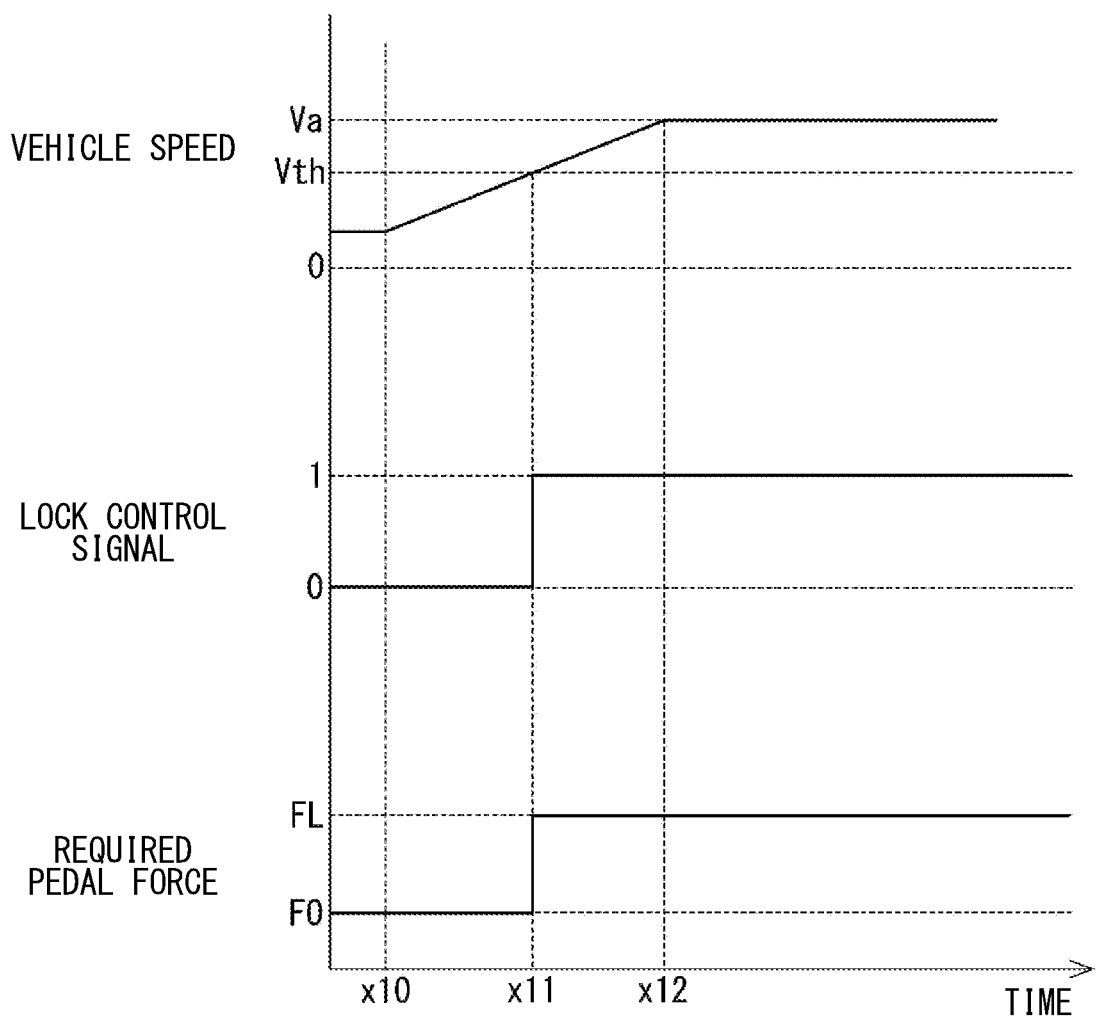
FIG. 5 is a time chart showing the locking operation control process according to the first embodiment.

The locking operation control process of the present embodiment will be described with reference to the time chart of FIG. 5. In FIG. 5, the horizontal axis represents a common time axis, and a vehicle speed, a lock control signal, and a required pedal force from a locked position are illustrated from the top. When the lock control signal is "1", the pedal lever 20 is locked, and when the lock control signal is "0", the pedal lever 20 is unlocked. The same applies to FIG. 7.

When the automatic driving is started at time x10, the vehicle speed V is smaller than the activation-determination lower limit value Vth; therefore, the pedal lever 20 is not locked. When the vehicle speed V becomes equal to or more than the activation-determination lower limit value Vth at time x11, the lock control signal is switched from 0 to 1, and the motor 41 is driven, so that the pedal lever 20 is locked. Further, when the vehicle speed V continues to be equal to or more than the activation-determination lower limit value Vth for a predetermined time or longer, the pedal lever 20 may be locked. When the pedal lever 20 is locked, a pedal force required to step on the pedal lever 20 from the locked position is changed from an initial value FO to a lock pedal force FL.

When the vehicle speed V reaches an automatic driving set vehicle speed Va at time x12, the vehicle speed V is maintained at the automatic driving set vehicle speed Va by the cruise control. As a result, the pedal lever 20 can be locked and functions as a footrest in a situation such as an expressway that does not require a pedal operation frequently.

As described above, the accelerator pedal system 1 of the present embodiment includes the pedal lever 20, the lock mechanism 50, the actuator 40, and the ECU 60. The pedal lever 20 operates in accordance with a step-on operation. The operation of the pedal lever 20 can be restricted by the lock mechanism 50. Here, the expression "the operation of the pedal lever can be restricted" is not limited to setting the movement amount to 0 by completely fixing the pedal lever 20, but is a concept including setting the movement amount to be smaller than that in the unlocked state. The actuator 40 switches between a locked state in which the operation of the pedal lever 20 is restricted by the lock mechanism 50 and an unlocked state in which the operation is not restricted.

The ECU 60 includes the locking operation determination unit 64, the actuator control unit 65, and the information acquisition unit 62. The locking operation determination unit 64 determines switching of the locking operation by the lock mechanism 50. The actuator control unit 65 controls driving of the actuator 40 in accordance with the determination result of the locking operation determination unit 64. In the present embodiment, the driving of the motor 41 is mainly controlled. The information acquisition unit 62 acquires vehicle speed information of the vehicle.

The locking operation determination unit 64 locks the pedal lever 20 when the vehicle is traveling in the automatic driving mode and the vehicle speed V becomes equal to or more than the activation-determination lower limit value Vth, which is the activation-determination lower limit value. In other words, in the present embodiment, the locking operation determination unit 64 determines switching of the locking operation on the basis of the vehicle speed information. In addition, the activation-determination lower limit value Vth is set to a value smaller than the automatic driving set vehicle speed Va; therefore, it can be said that the automatic driving set vehicle speed Va, which is a set vehicle speed for travelling by the automatic driving, is included in the vehicle speed range in which the pedal lever 20 is allowed to be locked in the automatic driving mode.

Therefore, the state of locking of the pedal lever 20 can be appropriately controlled. In detail, the state of locking of the pedal lever 20 is switched in accordance with the vehicle speed while the vehicle is traveling in the cruise control mode on a limited highway such as an expressway, where a pedal operation is not performed so frequently compared with an urban area or the like. Therefore, it is possible to reduce the frequency of the driver's operation of lock activation and lock releasing during driving, so that it is possible to reduce the burden of operation placed on the driver.

The ECU 60 includes the notification control unit 67 that causes the notification device 80 to notify that the pedal lever 20 has got locked. This enables the driver to know the state of locking of the pedal lever 20, so that the driver's psychological insecurity can be reduced.

Second Embodiment

Figure 6:
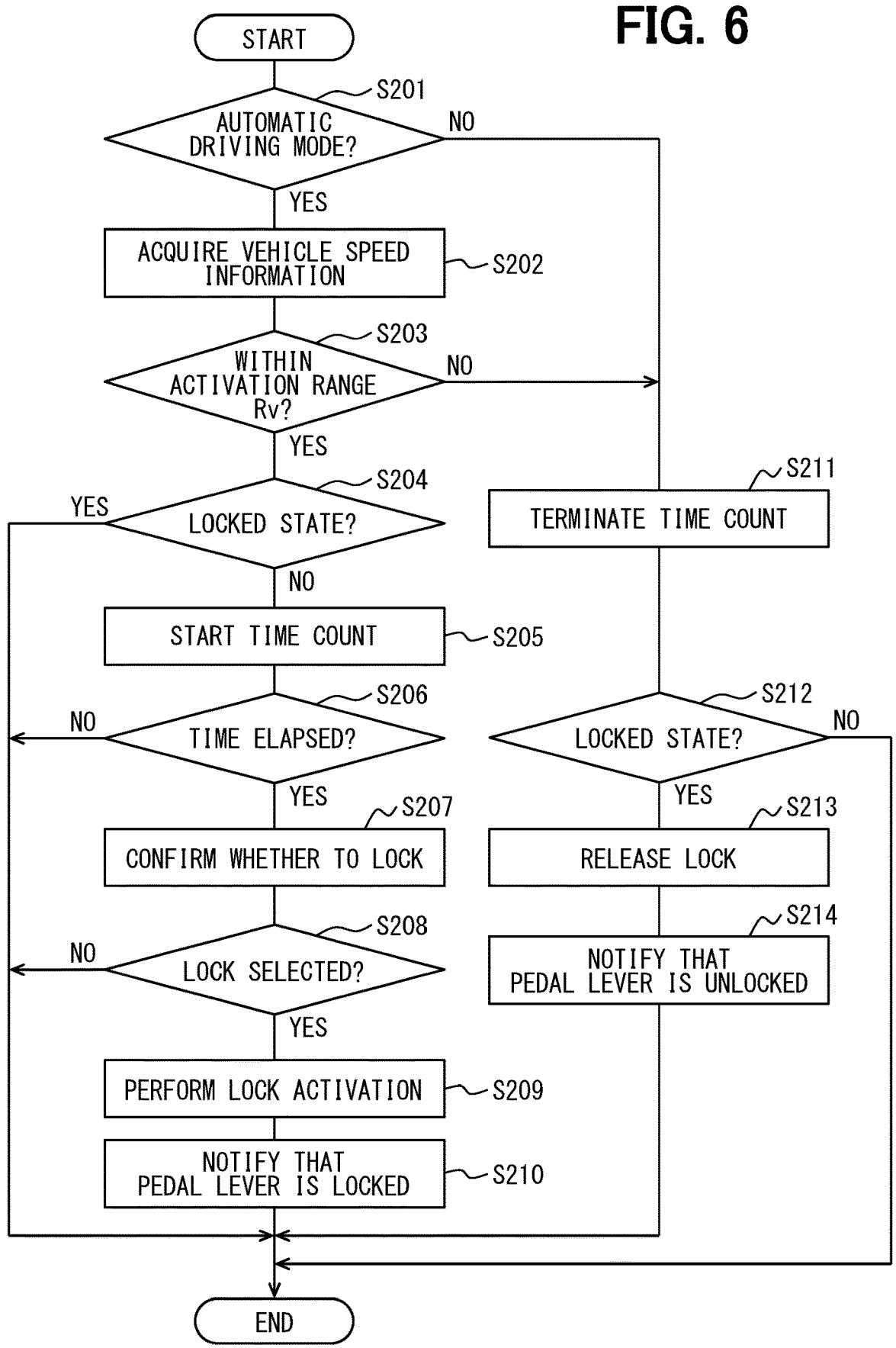
FIG. 6 is a flowchart showing a locking operation control process according to a second embodiment.
Figure 7:
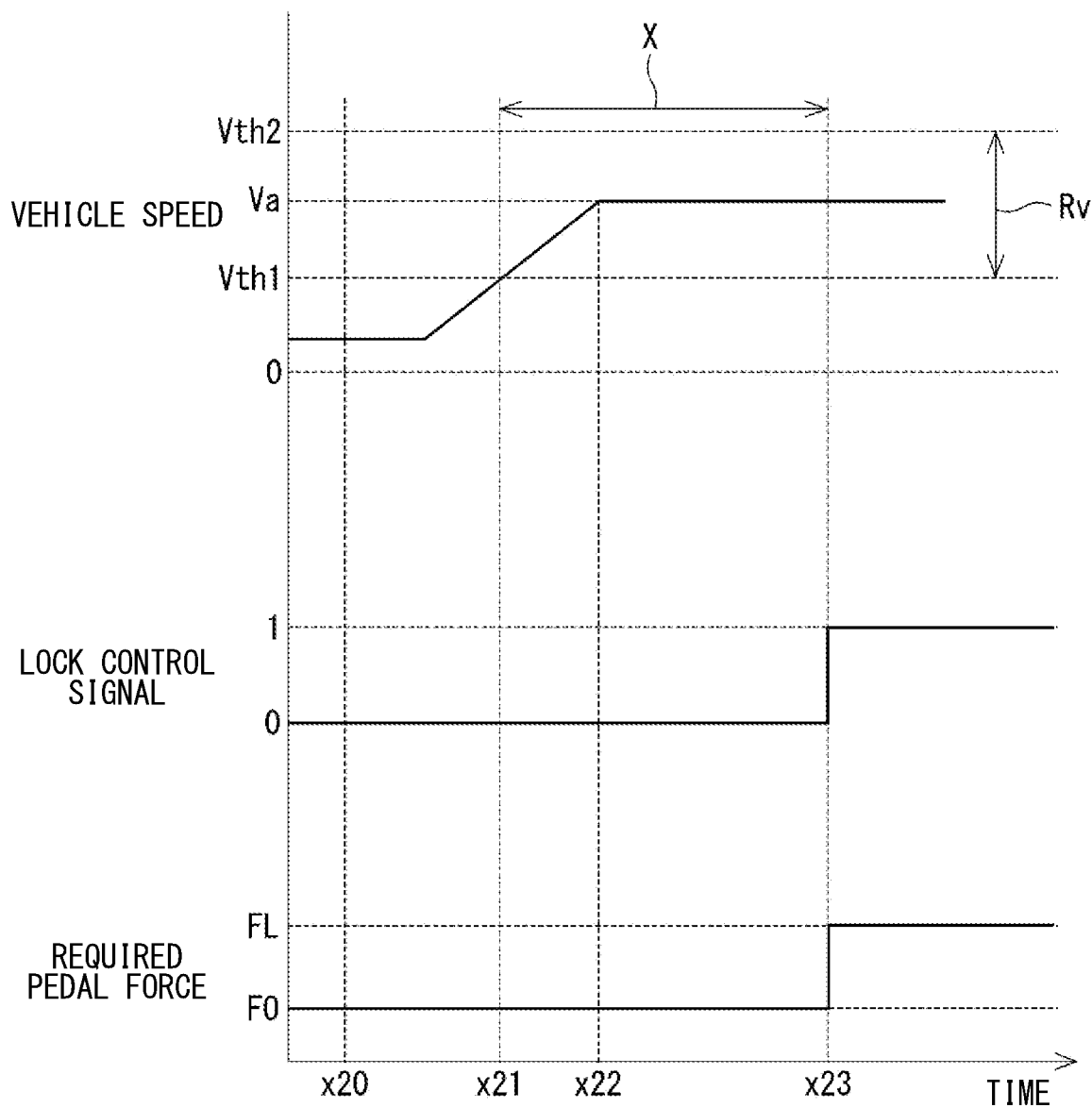
FIG. 7 is a time chart showing the locking operation control process according to the second embodiment.
Figure 8:
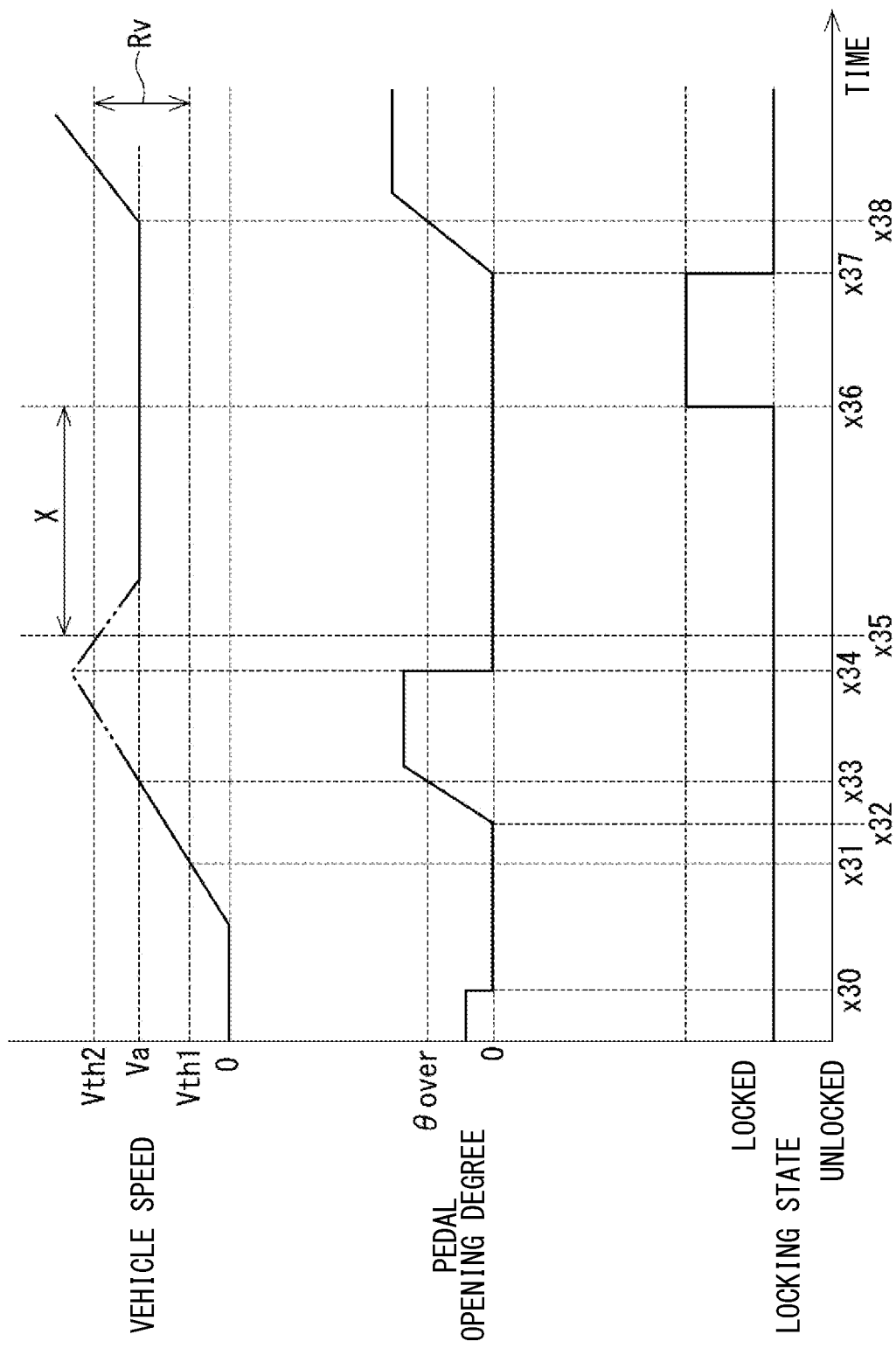
FIG. 8 is a time chart showing the locking operation control process according to the second embodiment.

A second embodiment is illustrated in FIGS. 6 to 8. In the present embodiment, the locking operation control process is different from that of the above embodiment; therefore, this point will be mainly described. A locking operation control process of the present embodiment will be described with reference to the flowchart of FIG. 6. The processes of S201 and S202 are the same as the processes of S101 and S102 in FIG. 4.

In S203, the locking operation determination unit 64 determines whether a vehicle speed V is within a lock activation range Rv. The lock activation range Rv related to the vehicle speed is a range including an automatic driving set vehicle speed Va. A lower limit value and an upper limit value of the lock activation range Rv are respectively defined as an activation-determination lower limit value Vth1 and an activation-determination upper limit value Vth2. That is, in the present embodiment, the lock activation range Rv corresponds to "a vehicle speed range in which the pedal lever is allowed to be locked in the automatic driving mode". If the vehicle speed V is determined to be out of the lock activation range Rv (S203: NO), the process proceeds to S211. If the vehicle speed V is determined to be within the lock activation range Rv (S203: YES), the process proceeds to S204.

In S204, the locking operation determination unit 64 determines whether the pedal lever 20 is in a locked state. If the pedal lever 20 is determined to be in a locked state (S204: YES), the process skips the process of S205 and the following steps, and the locked state is maintained. If the pedal lever 20 is determined not to be in a locked state (S204: NO), the process proceeds to S205, and an elapsed time from when the vehicle speed V falls within the lock activation range Rv is started to be counted. When the time count has already been started, the time count is continued.

In S206, the locking operation determination unit 64 determines whether a transition determination time has elapsed after the vehicle speed V fall within the lock activation range Rv. If the transition determination time X has not elapsed (S206: NO), the processes of S207 and the following steps are skipped. If the transition determination time X has elapsed (S206: YES), the process proceeds to S207. The processes of S207 to S210 are the same as the processes of S105 to S108 in FIG. 4.

If the vehicle speed V is out of the lock activation range Rv (S203: NO), the process proceeds to S211. In S211, the time count of the elapsed time since the vehicle speed V fall within the lock activation range Rv is terminated, and the timer is reset. When the timer has already been reset, the timer is maintained to be reset. The processes of S212 to S214 are the same as the processes of S109 to S111.

The locking operation control process of the present embodiment will be described with reference to the time charts of FIGS. 7 and 8. As illustrated in FIG. 7, when the automatic driving is started at time x20, the vehicle speed V is out of the lock activation range Rv; therefore, the pedal lever 20 is not locked. When the vehicle speed V becomes equal to or more than the activation-determination lower limit value Vth1 at time x21, time count is started. When the vehicle speed V reaches the automatic driving set vehicle speed Va at time x22, the vehicle speed V is maintained at the automatic driving set vehicle speed Va by the cruise control.

At time x23, at which the transition determination time x has elapsed since time x21, at which the vehicle speed V fall within the lock activation range Rv, the lock control signal is switched from 0 to 1, the motor 41 is driven, and the pedal lever 20 is locked. When the pedal lever 20 is locked, a pedal force required to step on the pedal lever 20 from the locked position is changed from an initial value FO to a lock pedal force FL.

In FIG. 8, the horizontal axis represents a common time axis, and a vehicle speed V, a pedal opening degree θ, and a state of locking are illustrated from the top. The same applies to FIG. 10 to be described later. When the automatic driving is started at time x30 and the driver stops applying a pedal force to the pad 21, the pedal lever 20 returns to the fully closed position by the biasing force of the pedal biasing member 37. At this time, the vehicle speed V is out of the lock activation range Rv; therefore, the pedal lever 20 is not locked.

When the vehicle speed V falls within the lock activation range Rv at time x31, time count is started. The pedal lever 20 is stepped on by the driver, for example, for merging into a lane or overtaking at time x32, and when the pedal opening degree θ exceeds an override start opening degree θ over corresponding to the automatic driving set vehicle speed Va at time x33, an automatic driving control is overridden, so that the time count related to lock activation is terminated. In the vehicle control during the override, the input from the driver is prioritized.

When the pedal force applied by the driver is released at time x34 and the pedal lever 20 returns to the fully closed position, the override is released and the vehicle is controlled by an input from the automatic driving side. When the vehicle speed V falls within the lock activation range Rv at time x35, time count is started; and at time x36, at which the transition determination time X elapses, the pedal lever 20 is locked.

When the locked state is released by the driver stepping on the pedal lever 20 at time x37, the vehicle speed V is within the lock activation range Rv, so that the time count is started. When acceleration is started during the override at time x38, the time count is terminated and the unlocked state is maintained.

In the present embodiment, the locking operation determination unit 64 maintains the unlocked state when the automatic driving mode is overridden by, for example, stepping on the pedal lever 20 before the transition determination time X elapses after the vehicle speed V becomes equal to or more than the activation-determination lower limit value Vth1 during traveling in the automatic driving mode. In addition, the locking operation determination unit 64 locks the pedal lever 20 when the mode returns to the automatic driving mode after the override is terminated and the vehicle speed V becomes equal to or more than the activation-determination lower limit value Vth1 and equal to or less than the activation-determination upper limit value Vth2.

At the time of merging into a lane or taking over, it is estimated from the vehicle speed whether it is necessary to step on the pedal lever 20 to accelerate, and the state of locking of the pedal lever 20 is switched. Therefore, it is possible to reduce the frequency of the driver's operation of lock activation and lock releasing during driving, so that it is possible to reduce the burden of operation placed on the driver. Further, the same effects as the above embodiment are obtained.

Third Embodiment

Figure 9:
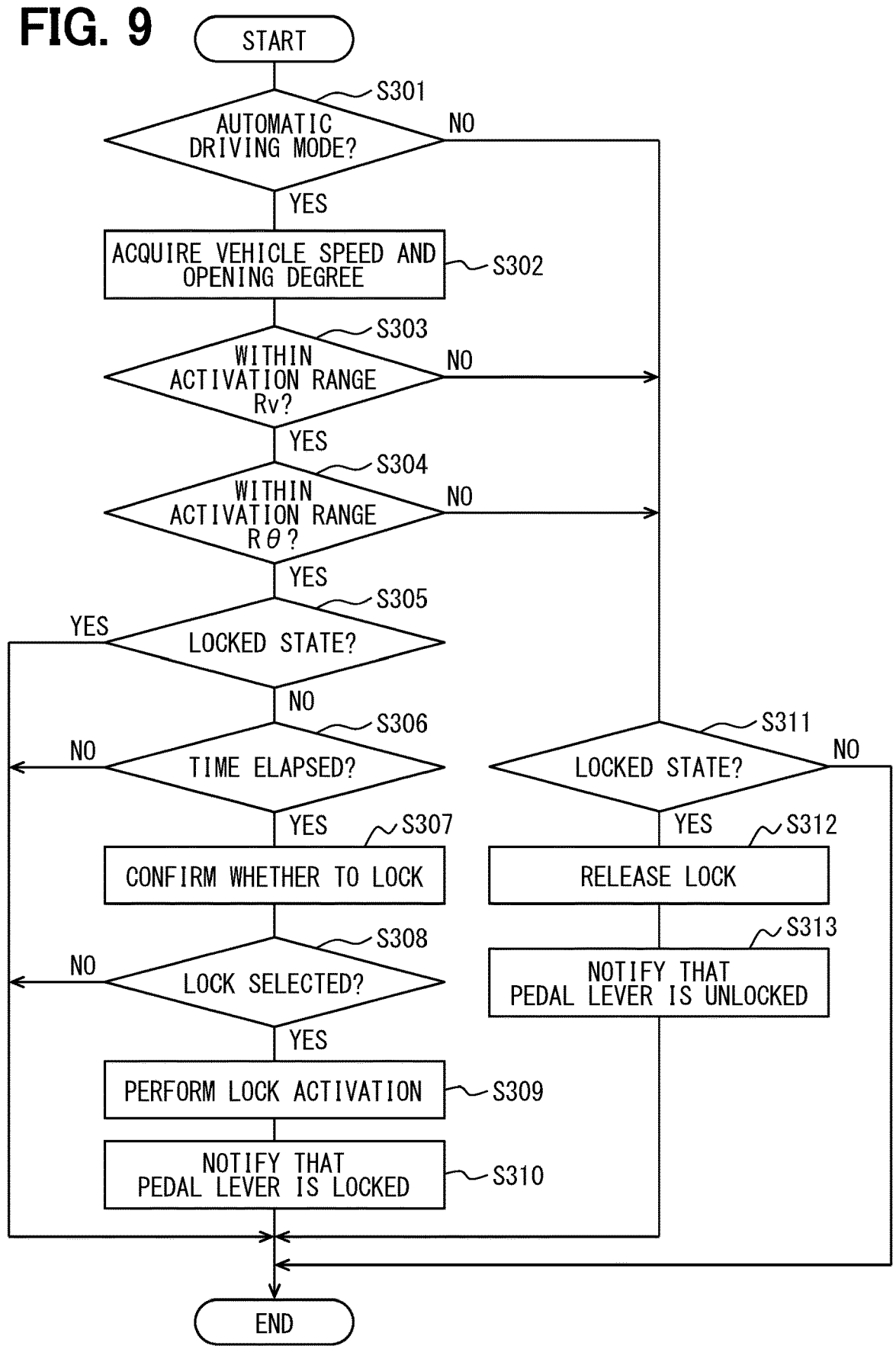
FIG. 9 is a flowchart showing a locking operation control process according to a third embodiment.

A third embodiment will be described with reference to FIGS. 9 and 10. A locking operation control process of the present embodiment will be described with reference to the flowchart of FIG. 9. The process of S301 is the same as that of S101 in FIG. 4, and when it is determined that the driving mode is not the automatic driving mode (S301: NO), the process proceeds to S311, and when it is determined that the driving mode is the automatic driving mode (S301: YES), the process proceeds to S302. In S302, the information acquisition unit 62 acquires vehicle speed information from the vehicle speed detector 75. The pedal opening degree detector 61 acquires pedal opening information from the pedal opening degree sensor 39.

In S303, the locking operation determination unit 64 determines, similarly to S203, whether a vehicle speed V is within a lock activation range Rv. If the vehicle speed V is determined to be out of the lock activation range Rv (S303: NO), the process proceeds to S311. If the vehicle speed V is determined to be within the lock determination range (S303: YES), the process proceeds to S304.

In S304, the locking operation determination unit 64 determines whether a pedal opening degree θ is within a lock activation range R. A lower limit value and an upper limit value of the lock activation range $R\theta$ are respectively $\theta th1$ and $\theta th2$. When the pedal lever 20 is maintained near the fully closed position, it can be considered that the driver has a low intention to operate the pedal. Therefore, it is preferable that the lock activation range $R\theta$ related to the pedal opening degree $\theta$ be set near the fully closed position. In the present embodiment, the lower limit value $\theta th1$ is set to 0. If the pedal opening degree $\theta$ is determined to be out of the lock activation range $R\theta$ (S304: NO), the process proceeds to S311. If the pedal opening degree $\theta$ is determined to be within the lock activation range $R\theta$ (S304: YES), the process proceeds to S305.

Figure 4:
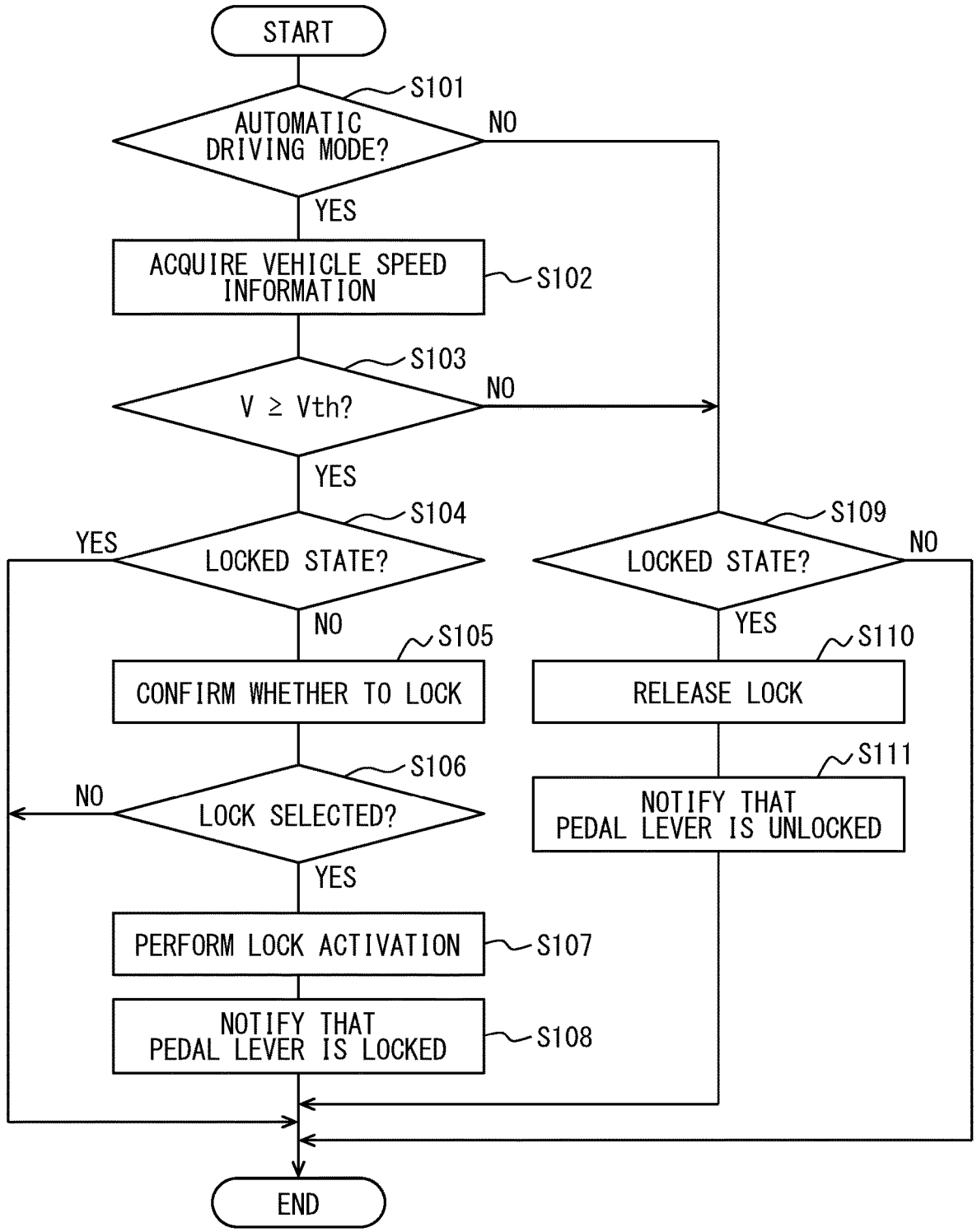
FIG. 4 is a flowchart showing a locking operation control process according to the first embodiment.

The process of S305 is the same as the process of S104 in FIG. 4, and if the pedal lever 20 is determined to be in a locked state (S305: YES), the processes of S306 and the following steps are skipped, and the locked state is maintained. If the pedal lever 20 is determined not to be in the locked state (S305: NO), time count is started, and the process proceeds to S306. When the time count has already been started, the time count is continued.

In S306, it is determined whether the transition determination time X has elapsed after both the vehicle speed V and the pedal opening degree $\theta$ fall within the lock activation ranges. The elapsed time after the vehicle falls within the lock activation range may be counted individually for each of the vehicle speed V and the pedal opening degree $\theta$. If the transition determination time X has not elapsed since both the vehicle speed V and the pedal opening degree $\theta$ fall within the lock activation range (S306: NO), the processes of S307 and the following steps are skipped. If the transition determination time X has not elapsed since both the vehicle speed V and the pedal opening degree $\theta$ fall within the lock activation range (S306: YES), the processes proceeds to S307. The processes of S307 to S313 are the same as the processes of S105 to S111 in FIG. 4.

The locking operation control process of the present embodiment will be described with reference to the time chart of FIG. 10. When the automatic driving is started at time x40, both the vehicle speed V and the pedal opening degree $\theta$ fall within the lock determination range at time x41.

When the pedal lever 20 is stepped on by the driver at time x42 and the pedal opening degree $\theta$ then goes out of the lock activation range $R\theta$ at time x43, which is before the transition determination time X elapses since time x41, the time count is terminated, and the timer is reset.

When the pedal opening degree $\theta$ exceeds the override start opening degree $\theta$ over corresponding to the automatic driving set vehicle speed Va at time x44, the override is started, and acceleration is started. When the pedal force applied by the driver is released and the pedal lever 20 returns to the fully closed position at time x45, the override is released and the vehicle is controlled by an input from the automatic driving side.

At time x46, both the vehicle speed V and the pedal opening degree $\theta$ fall within the lock activation range, time count is started, and the pedal lever 20 is locked at time x47, at which the transition determination time X has elapsed since time x46.

As indicated by a broken line at time x48, when the automatic driving is released by a brake operation, the pedal lever 20 is unlocked. Alternatively, as indicated by a solid line, when the vehicle speed V is reduced due to an oncoming vehicle ahead or the like and goes out of the lock activation range Rv at time x49, the pedal lever 20 is unlocked.

In the present embodiment, the locking operation determination unit 64 determines switching of the locking operation on the basis of the pedal opening degree $\theta$, which is the opening degree of the pedal lever 20, in addition to the vehicle speed V during traveling in the automatic driving mode. In detail, the pedal lever 20 is locked when the following conditions are all satisfied: the vehicle is traveling in the automatic driving mode; the vehicle speed V is within the lock activation range Rv; and the pedal opening degree $\theta$ is within the lock activation range $R\theta$, which is the opening degree determination range.

It is estimated, by monitoring the pedal opening degree $\theta$, whether the pedal lever 20 needs to be operated, and the state of locking of the pedal lever 20 is switched. Therefore, it is possible to reduce the frequency of the driver's operation of lock activation and lock releasing during driving, so that it is possible to reduce the burden of operation placed on the driver. Further, the same effects as the above embodiments are obtained.

Other Embodiments

In the above embodiments, the locking member 51 is provided on a fixed side, and the locked portion 52 is provided on a movable side. In other embodiments, the locking member may be provided on a movable side, and the locked portion may be provided on the fixed side. In the above embodiments, the locked portion is formed of a projection. In other embodiments, the locked portion may be formed of a recess. One of the locked portion and the locking member does not have to be provided on a spur gear, and may be provided on a member other than a spur gear that constitutes the power transmission mechanism.

In the above embodiments, the locking member is provided to be movable in a linear direction along the axial direction of the resilient member, which is a compression coil spring. In other embodiments, the locked state and the unlocked state may be switched by rotation of the locking member. When the state of locking is switched by rotation of the locking member, it is possible to reduce uneven wear of an abutting portion. In other embodiments, the resilient member does not have to be a compression coil spring, and may be a torsion spring, for example. Alternatively, the locking member itself may be formed of an elastic member such as rubber, and may be elastically deformed to switch the state of locking.

In addition, the power transmission mechanism and the lock mechanism may be different from those in the above embodiments. The shapes of the locking member and the locked portion may be different from those in the above embodiments, depending on component layout or the like. In the above embodiments, a common actuator is used to apply a reaction force to the pedal lever and to activate a locking operation. In other embodiments, an actuator for applying a reaction force and an actuator for activating a lock operation may be separately provided.

In the above embodiments, the lock mechanism can hold the locked state in a non-energized state where energization of the motor is turned off. In other embodiments, the lock mechanism may be configured to maintain the locked state by continuously energizing the motor.

In the above embodiments, the pedal lever is locked at the fully closed position by the lock mechanism. In other embodiments, the pedal lever may be locked at the fully opened position or may be locked at an intermediate position between the fully closed position and the fully opened position. Further, the pedal lever may be configured to be capable of being locked in a stepwise manner at a plurality of positions.

In the above embodiments, notification to the driver is performed at the time of lock activation and the time of lock releasing. In other embodiments, at least one of the notification at the time of lock activation and the notification at the time of lock releasing may be omitted. Whether to notify or not to notify may be changed depending on situations. For example, a notification is performed immediately after the start of automatic driving, and a notification is not performed at the time of lock activation when an override is terminated during automatic driving. The same applies to whether to confirm or not to confirm the driver's intention related to lock activation and lock releasing.

According to an exemplar of the present disclosure, an accelerator pedal system includes a pedal lever configured to perform an operation in accordance with a step-on operation, a lock mechanism configured to restrict the operation of the pedal lever, an actuator configured to switch between a locked state in which the operation of the pedal lever is restricted by the lock mechanism and an unlocked state in which the operation of the pedal lever is free from restriction by the lock mechanism, and a controller including at least one processor configured to determine switching of a locking operation by the lock mechanism, to control a driving operation of the actuator, and to acquire vehicle speed information. The controller locks the pedal lever in response with a vehicle speed being equal to or more than an activation-determination lower limit value when a vehicle is traveling in an automatic driving mode.

The controller may be configured to set an override mode, in which an input by the step-on operation is always prioritized when both an automatic driving and the step-on operation are input, before a transition determination time elapses after the vehicle speed becomes equal to or more than the activation-determination lower limit value during traveling in the automatic driving mode, and to maintain the unlocked state during the override mode. In addition, the controller may be configured to lock the pedal lever in response to that the automatic driving mode is resumed after the override mode is terminated and the vehicle speed becomes equal to or more than the activation-determination lower limit value and equal to or less than an activation-determination upper limit value.

A control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. An accelerator pedal system comprising:
   a pedal lever configured to perform an operation in accordance with a step-on operation;
   a lock mechanism configured to restrict the operation of the pedal lever;
   an actuator configured to switch between a locked state in which the operation of the pedal lever is restricted by the lock mechanism and an unlocked state in which the operation of the pedal lever is free from restriction by the lock mechanism; and
   a controller including
   a locking operation determination unit configured to determine switching of a locking operation by the lock mechanism,
   an actuator control unit configured to control a driving operation of the
   actuator, and
   an information acquisition unit configured to acquire vehicle speed
   information, wherein:
   the controller is configured to start a time count of an elapsed time from when a vehicle speed is equal to or more than an activation-determination lower limit value,
   the locking operation determination unit locks the pedal lever (i) when a vehicle is traveling in an automatic driving mode, and (ii) when the controller determines that the elapsed time passes a transition determination time and (iii) the when vehicle speed is equal to or more than the activation-determination lower limit value, and
   the locking operation determination unit maintains the unlocked state in a case where the automatic driving mode is subjected to overriding before the transition determination time elapses after the vehicle speed becomes equal to or more than the activation-determination lower limit value during traveling in the automatic driving mode.

2. The accelerator pedal system according to claim 1, wherein
   the locking operation determination unit locks the pedal lever in a case where the automatic driving mode is resumed after the overriding is terminated and the vehicle speed becomes equal to or more than the activation-determination lower limit value and equal to or less than an activation-determination upper limit value.

3. The accelerator pedal system according to claim 1, wherein the locking operation determination unit determines the switching of the locking operation, based on an opening degree of the pedal lever in addition to the vehicle speed during traveling in the automatic driving mode.

4. The accelerator pedal system according to claim 1, wherein a vehicle speed range in which the pedal lever is allowed to be locked in the automatic driving mode includes a vehicle speed that is set for traveling in the automatic driving mode.

5. The accelerator pedal system according to claim 1, wherein the controller includes a notification control unit configured to cause a notification device to notify that the pedal lever is locked.

6. The accelerator pedal system according to claim 1, wherein
   the controller is configured to terminate the time count of the elapsed time to reset the time count, when the vehicle speed is out of a lock activation range that is a range between the activation-determination lower limit value and an activation-determination upper limit value allowable in the automatic driving mode.

7. The accelerator pedal system according to claim 1, wherein
the controller is configured to hold the locked state in a non-energized state in which energization to the actuator is turned off.

8. An accelerator pedal system comprising:
a pedal lever configured to perform an operation in accordance with a step-on operation;
a lock mechanism configured to restrict the operation of the pedal lever;
an actuator configured to switch between a locked state in which the operation of the pedal lever is restricted by the lock mechanism and an unlocked state in which the operation of the pedal lever is free from restriction by the lock mechanism; and
a controller including at least one processor configured to determine switching of a locking operation by the lock mechanism, to control a driving operation of the actuator, and to acquire vehicle speed information, wherein:
the controller is configured to start a time count of an elapsed time from when a vehicle speed is equal to or more than an activation-determination lower limit value,
the controller locks the pedal lever in response with the vehicle speed being equal to or more than activation-determination lower limit value when the controller determines that the elapsed time passes a transition determination time and when the vehicle is traveling in an automatic driving mode, and
the controller is configured to:
set an override mode, in which an input by the step-on operation is always prioritized when both an automatic driving and the step-on operation are input, before the transition determination time elapses after the vehicle speed becomes equal to or more than the activation-determination lower limit value during travelling in the automatic driving mode, and
maintain the unlocked state during the override mode.

9. The accelerator pedal system according to claim 7, wherein
the controller is configured to lock the pedal lever in response to that the automatic driving mode is resumed after the override mode is terminated and the vehicle speed becomes equal to or more than the activation-determination lower limit value and equal to or less than an activation-determination upper limit value.

10. The accelerator pedal system according to claim 8, wherein
the controller is configured to terminate the time count of the elapsed time to reset the time count, when the vehicle speed is out of a lock activation range that is a range between the activation-determination lower limit value and an activation-determination upper limit value allowable in the automatic driving mode.

11. The accelerator pedal system according to claim 8, wherein
the controller is configured to hold the locked state in a non-energized state in which energization to the actuator is turned off.

* * * * *